(12) United States Patent
Kim

(10) Patent No.: US 6,292,658 B1
(45) Date of Patent: Sep. 18, 2001

(54) METHOD FOR FORWARDING CALL IN HIGH PENETRATION NOTIFICATION MODE IN SATELLITE COMMUNICATION TERMINAL

(75) Inventor: Eun-Ho Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/197,010

(22) Filed: Nov. 20, 1998

(30) Foreign Application Priority Data

Nov. 20, 1997 (KR) .................................................. 97-61575

(51) Int. Cl.⁷ ..................................................... H04M 3/42
(52) U.S. Cl. .......................... 455/417; 455/12.1; 455/428; 379/211; 379/212
(58) Field of Search ..................................... 455/413, 414, 455/415, 417, 427, 428, 430, 12.1, 13.1, 515, 552, 560, 516, 517; 379/210, 211, 212, 221, 207

(56) References Cited

U.S. PATENT DOCUMENTS

| 5,027,384 | | 6/1991 | Morganstein | 379/88.23 |
| 5,448,627 | | 9/1995 | Ueno et al. | 379/67.1 |
| 5,469,500 | | 11/1995 | Satter et al. | 379/201 |
| 5,509,062 | * | 4/1996 | Carlsen | 379/210 |
| 5,592,541 | | 1/1997 | Fleischer, III et al. | 379/211 |
| 5,657,382 | | 8/1997 | Tamagawa et al. | 379/211 |
| 5,717,830 | * | 2/1998 | Sigler et al. | 455/426 |
| 5,745,851 | | 4/1998 | Goto | 455/432 |
| 5,758,281 | * | 5/1998 | Emery et al. | 455/428 |
| 5,884,170 | * | 3/1999 | Valentine et al. | 455/433 |
| 5,978,673 | * | 11/1999 | Alperovich et al. | 455/417 |
| 6,046,990 | * | 4/2000 | Chennakeshu et al. | 370/317 |
| 6,049,601 | * | 4/2000 | Orui | 379/211 |
| 6,067,452 | * | 5/2000 | Alexander | 455/428 |
| 6,088,589 | * | 7/2000 | Valentine et al. | 455/433 |

FOREIGN PATENT DOCUMENTS

WO 99/14961 * 3/1999 (WO) .................................. 455/433

* cited by examiner

Primary Examiner—Tracy Legree
Assistant Examiner—Charles Craver
(74) Attorney, Agent, or Firm—Dilworth & Barrse, LLP

(57) ABSTRACT

A method is provided for forwarding a call in a satellite communication system having a memory with a call forwarding table for storing satellite communication subscriber numbers and call forwarding numbers. The method includes the step of forming a communication path with a calling communication terminal upon detecting an incoming call. It is then checked whether a calling subscriber is a satellite communication subscriber. A subscriber number of the calling subscriber and a call forwarding number corresponding to the subscriber number is stored in the call forwarding table, when the calling subscriber is the satellite communication subscriber. It is then checked whether another incoming call to the subscriber number is detected. The other incoming call is forwarded to the call forwarding number corresponding to the subscriber number, when the other incoming call to the subscriber number is detected. The forwarding step is performed in a high penetration notification mode in the satellite communication system.

3 Claims, 4 Drawing Sheets

METHOD FOR FORWARDING CALL IN HIGH PENETRATION NOTIFICATION MODE IN SATELLITE COMMUNICATION TERMINAL

BACKGROUND OF THE INVENTION

1. Field of the Invention

The present invention relates generally to satellite communications and, more particularly, to a method for forwarding an incoming call received in a satellite communication terminal in a high penetration notification mode to a communication terminal connected to a PSTN (Public Switched Telephone Network) or an ISDN (Integrated Services Digital Network).

2. Description of the Related Art

A satellite communication terminal has a middle penetration (MP) mode and a high penetration notification (HPN) mode. In the MP mode, a satellite communication system provides a voice service which is a basic service, and a short message service which is a supplemental service. In the HPN mode, which is set when the satellite communication terminal is in an area where MP mode service cannot be provided, the satellite communication system informs the satellite communication terminal that a call (i.e., voice service or short message) is being received by transmitting a high-power, high-penetration radio wave.

FIG. 1 is a block diagram of a general satellite communication system. A service center 40 controls the overall operations of the satellite communication system. A switching station 20 switches a call received from a first communication terminal 5 through a PSTN or ISDN 10 or from a second communication terminal 85 through another PSTN or ISDN 70. The switching station 20 has a subscriber database 22 and a subscriber authenticator 24. The subscriber database 22 stores information about satellite communication subscribers. The subscriber authenticator 24, under the control of the service center 40, checks whether or not a calling subscriber is a subscriber registered in the subscriber database 22. A satellite base station 30 receives a call switched from the switching station 20 and transmits it as a radio signal to a satellite 50. The satellite 50 receives the radio signal from the satellite base station 30 and forms a link with a satellite communication terminal 60. A reference number 80 denotes a closed space 80, such as an underground subway station or the interior of a building.

In the MP mode, the satellite communication terminal 60 can directly communicate with the satellite 50 to provide the voice service and the short message service. However, if the satellite communication terminal 60 moves into the closed space 80 where it cannot directly communicate with the satellite 50, then the services in the MP mode are not offered. This is because a radio wave sent from the satellite 50 has a property of traveling straight. Therefore, the satellite 50 transmits a high-power, high-penetration radio wave to inform the satellite communication terminal 60 within the closed space 80 that a call is being received. The satellite 50 sends both a radio wave of the MP mode and a radio wave of the HPN mode (i.e., a high power radio wave) to an HPN service subscriber. When the radio wave of the MP mode and the radio wave of the HPN mode reach the closed space 80, the radio wave of the HPN mode passes through the closed space 80.

If the satellite communication terminal 60 is situated within the closed space 80 and a call from another communication terminal is received by the satellite communication terminal 60, only the radio wave of the HPN mode is received. The radio wave of the HPN mode only indicates whether the received call is a voice service or a short message service. Hence, if the radio wave of the HPN mode is received, the satellite communication terminal 60 informs a subscriber through a liquid crystal display (LCD) that a call of the voice service or short message service is received and generates an alert tone. Consequently, in the HPN mode, a satellite communication subscriber may be made aware of the fact that a call is received, but the subscriber cannot answer the call or receive a short message.

SUMMARY OF THE INVENTION

It is an object of the present invention to provide a call forwarding method which can answer a call or read a short message even in a high penetration notification (HPN) mode of a satellite communication terminal.

To achieve the above and other objects, there is provided a method for forwarding a call in a high penetration notification mode in a satellite communication system having a memory with a call forwarding table for storing satellite communication subscriber numbers and call forwarding numbers. The method includes the steps of: forming a communication path with a calling communication terminal upon detecting an incoming call, and checking whether a calling subscriber is a satellite communication subscriber; storing a subscriber number of the calling subscriber and a call forwarding number corresponding to the subscriber number in the call forwarding table, when the calling subscriber is the satellite communication subscriber; and checking whether another incoming call to the subscriber number is detected and forwarding the other incoming call to the call forwarding number corresponding to the subscriber number, when the other incoming call to the subscriber number is detected, the forwarding step being performed in a high penetration notification mode in the satellite communication system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well-known functions or constructions which may obscure the present invention in unnecessary detail are not described in detail.

Figure 1:
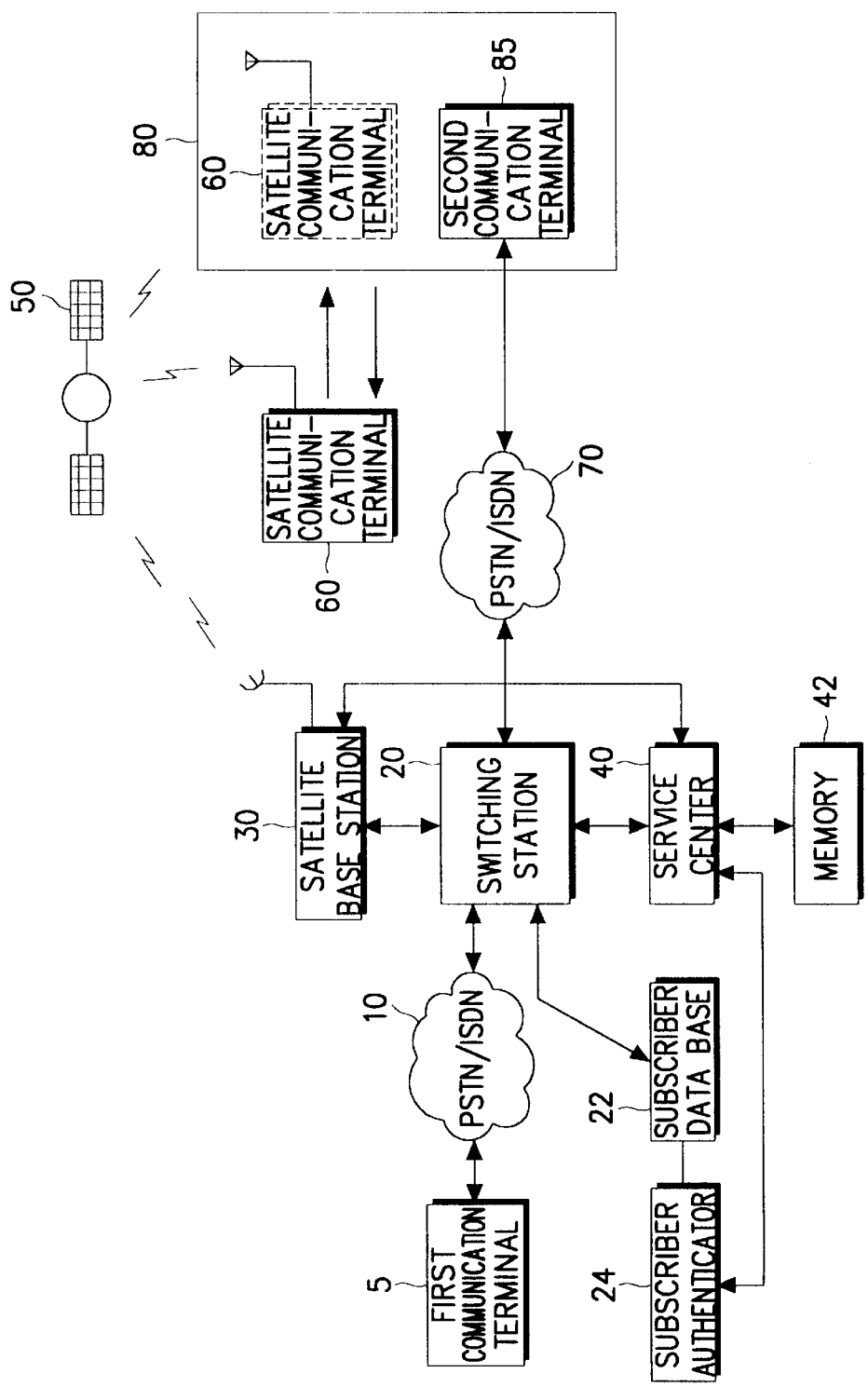
FIG. 1 is a block diagram of a general satellite communication system.
Figure 2A:
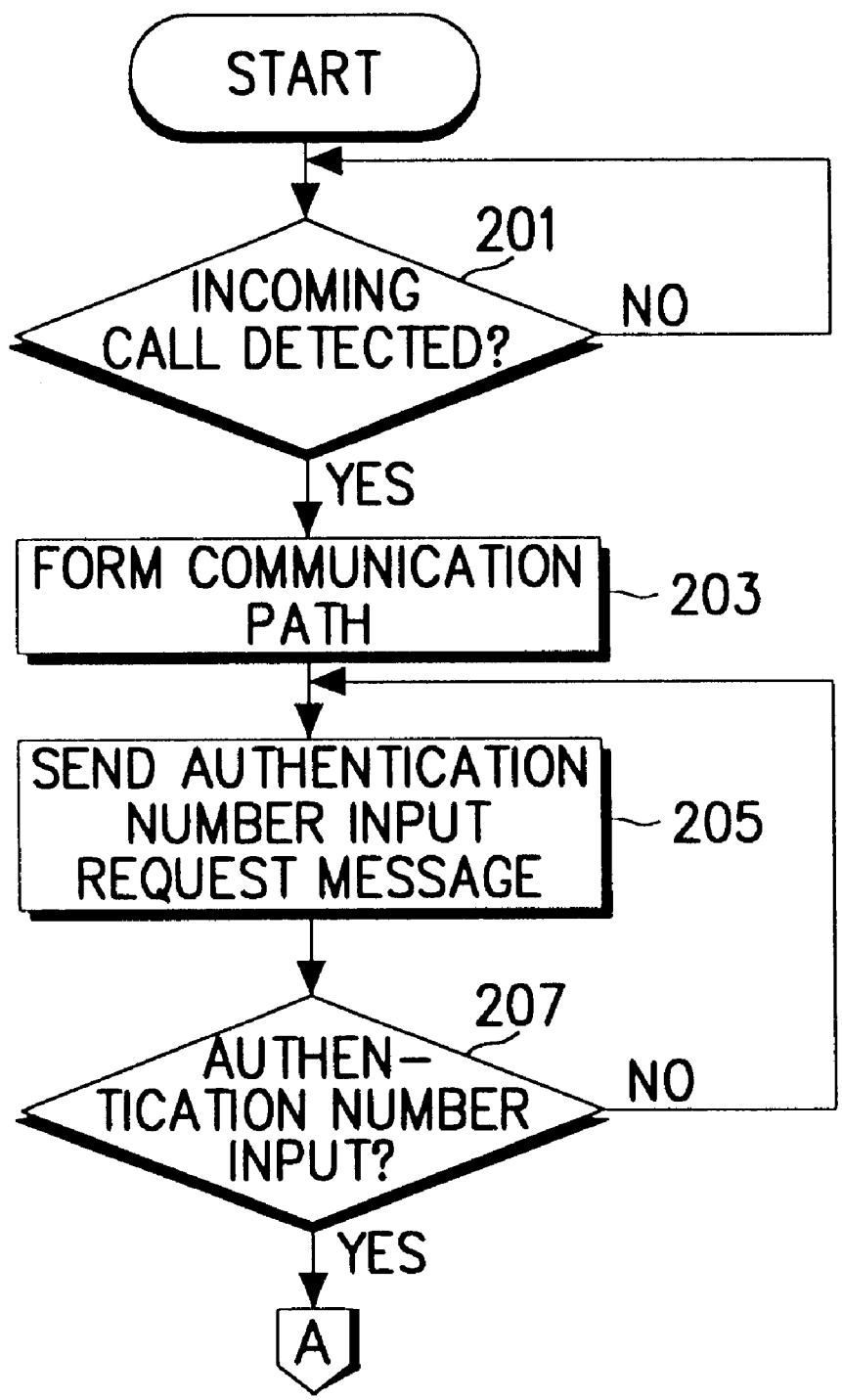
FIGS. 2A and 2B are flow charts illustrating a method for forwarding a call and providing short message service in a high penetration notification mode of a satellite communication system according to an embodiment of the present invention.
Figure 2B:
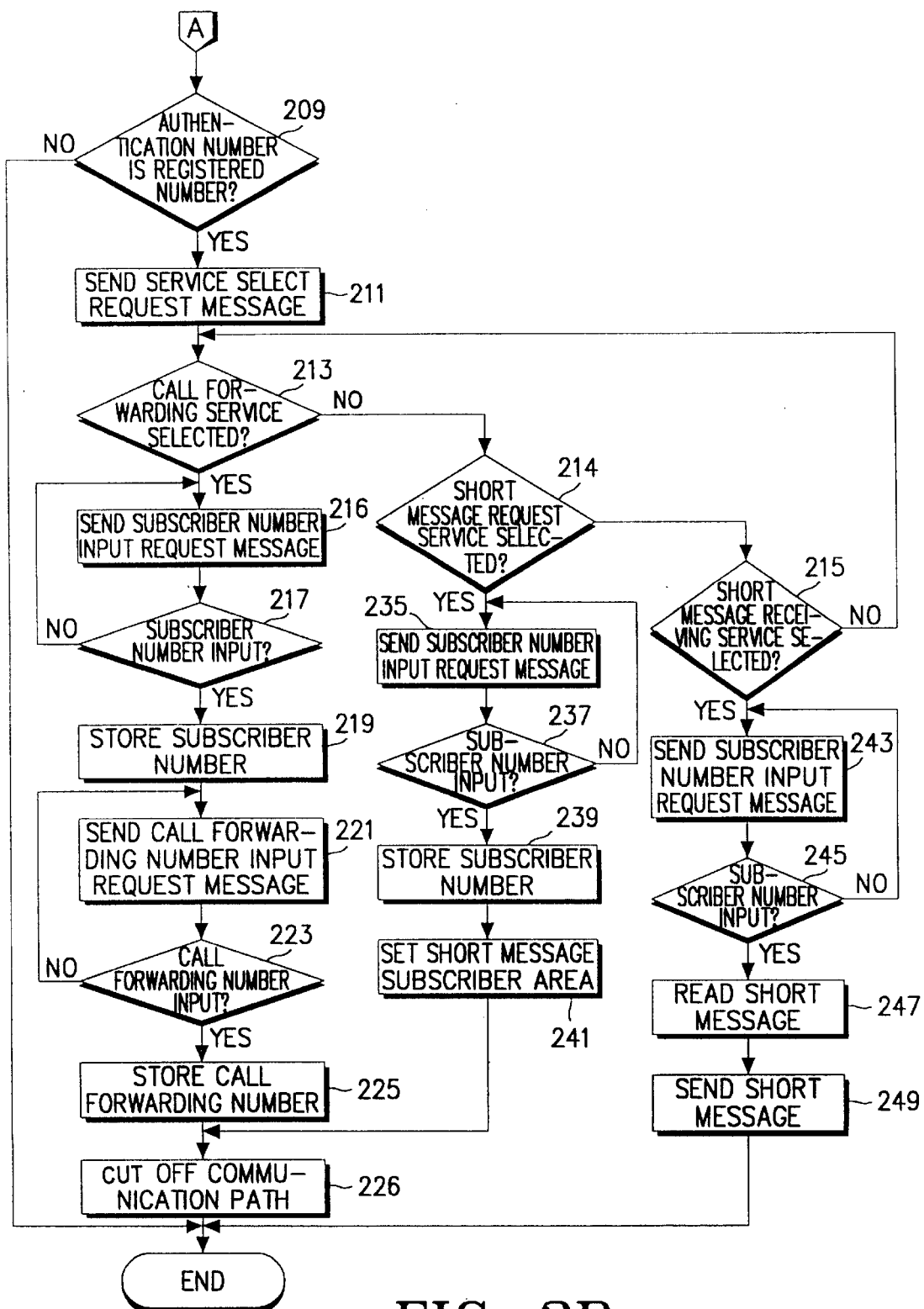

FIGS. 2A and 2B are flow charts illustrating a method for forwarding a call and providing short message service in a high penetration notification (HPN) mode of a satellite communication system according to an embodiment of the present invention. If a subscriber senses that the satellite communication terminal 60 is in the HPN mode, the subscriber dials the service center 40 using the second communication terminal 85. The service center 40 checks whether or not an incoming call from the second communication terminal 85 is detected (step 201). If an incoming call is detected, the service center 40 forms a communication path with the second communication terminal 85 (step 203).

The service center 40 sends a subscriber authentication number input request message to the second communication terminal 85 by voice (step 205). It is then checked whether or not a subscriber authentication number is input (step 207). If the number is input, it is then checked through the subscriber authenticator 24 whether or not the input subscriber authentication number is a number registered as a satellite communication subscriber (step 209). This is done by comparing the subscriber authentication number with subscriber information stored in the subscriber database 22.

If the subscriber authentication number is authenticated as that of a satellite communication subscriber, then a service select request message is sent to the second communication terminal 85 (step 211). However, if the subscriber authentication number is not authenticated, then the method is terminated. The service select request message is a message for requesting that the subscriber select one of a call forwarding service, a short message request service and a short message receiving service.

Figures 3, 4:
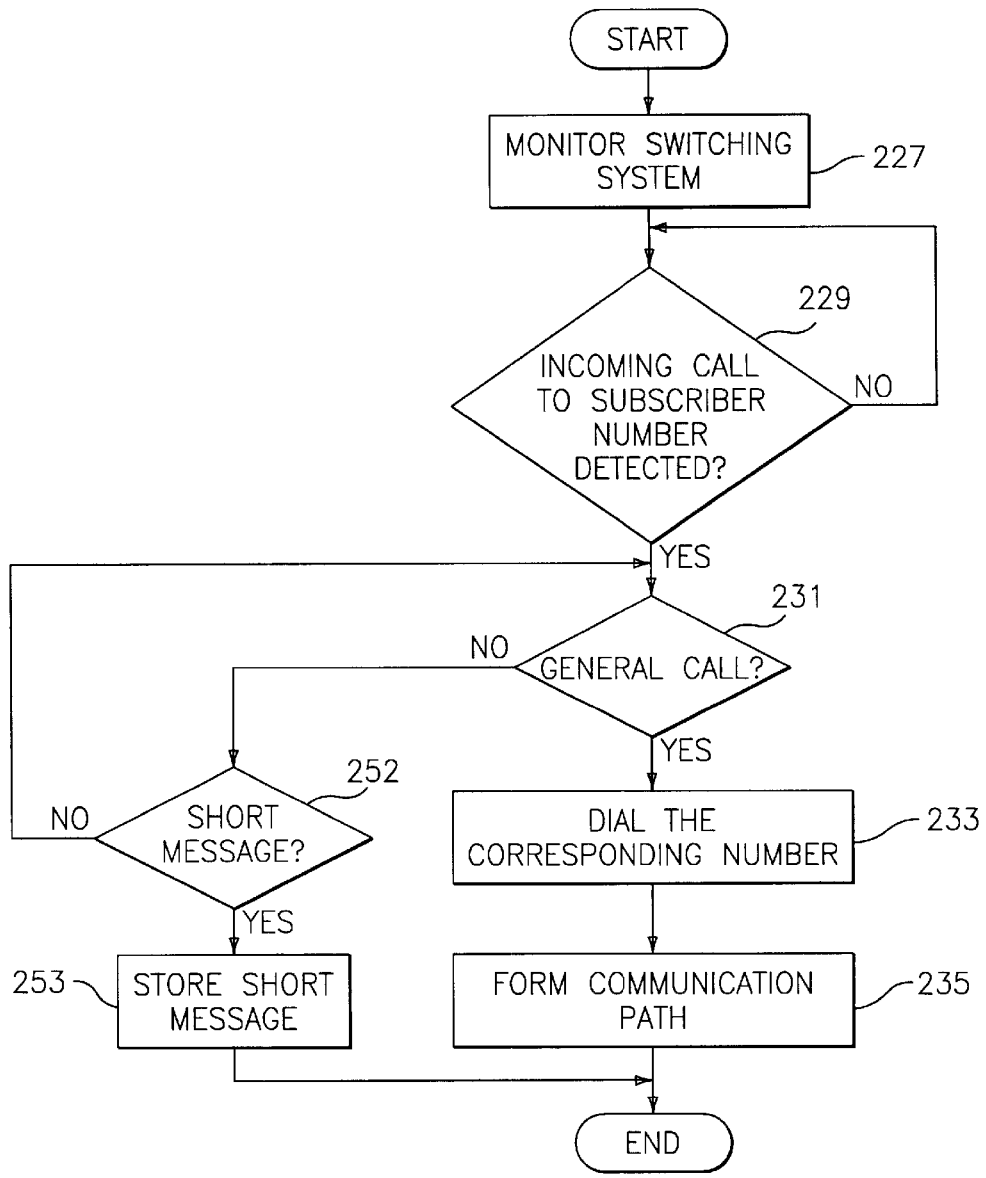
FIG. 3 is a flow chart illustrating a method for forwarding a call and storing a short message in a high penetration notification mode of a satellite communication system according to an embodiment of the present invention.
FIG. 4 is a diagram illustrating a call forwarding table according to an embodiment of the present invention.

The service center 40 checks whether or not one of the call forwarding service, the short message request service or the short message receiving service is selected at steps 213, 214 and 215, respectively. If the call forwarding service is selected at step 213, then the service center 40 sends a subscriber number input request message to the second communication terminal 85 (step 216). Next, it is checked whether or not a subscriber number is input (step 217). If the subscriber number is input, then the service center 40 stores the subscriber number in a subscriber number area of a call forwarding table shown in FIG. 4 (step 219). Referring to FIG. 4, the characters "xxx" represent a satellite communication service code, and the digits after "xxx" are the subscriber number.

The service center 40 sends a call forwarding number input request message to the second communication terminal 85 (step 221). It is then checked whether or not a call forwarding number is input (step 223). If the call forwarding number is input, then the call forwarding number is stored in a call forwarding number area of the call forwarding table shown in FIG. 4 (step 225). The service center 40 then cuts off the communication path (step 226).

Meanwhile, if the short message request service is selected at step 214, then the subscriber number input request message is sent to the second communication terminal 85 (step 235). It is then checked whether or not the subscriber number is input (step 237). If the subscriber number is input, then the subscriber number is stored in the memory 42 (step 239). The service center 40 sets a short message subscriber area for the subscriber number in the memory 42 (step 241) and proceeds to step 226 to cut off the communication path.

If such a short message request process is ended, a received short message can be read by selecting the short message receiving service. That is, if the short message receiving service is selected at step 215, then the subscriber number input request message is sent to the second communication terminal 85 (step 243). It is then checked whether or not the subscriber number is input (step 245). If the subscriber number is input, then a short message is read from the memory 42 (step 247). The short message is sent to a corresponding subscriber, for example, the second communication terminal 85 (step 249). In this case, the second communication terminal 85 should include a liquid crystal display (LCD) which can display the short message.

FIG. 3 is a flow diagram illustrating a method for forwarding a call and storing a short message in a high penetration notification (HPN) mode of a satellite communication system according to an embodiment of the present invention. The service center 40 monitors the switching station 20 (step 227). Next, the service center 40 checks whether or not an incoming call to the subscriber number stored in the call forwarding table of the memory 42 is detected (step 229). If the incoming call is detected, then the service center 40 checks whether or not the incoming call is a general call (step 231). If the incoming call is a general call, then the service center dials the corresponding call forwarding number (step 233) and forms a communication path (step 235) to enable the call. However, if the incoming call is not a general call at step 231, then it is checked whether or not the incoming call is a short message (step 252). If the incoming call is a short message, then the service center 40 stores the short message (253).

As described above, even if the subscriber using the satellite communication terminal is in an HPN mode area, he or she can answer an incoming call or receive a short message through an adjacent communication terminal connected to the PSTN or ISDN.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for forwarding a call in a satellite communication system having a memory with a call forwarding table for storing satellite communication subscriber numbers and call forwarding numbers, said method comprising the steps of:

storing a subscriber number of the calling subscriber and a call forwarding number corresponding to the subscriber number in the call forwarding table, when the calling subscriber is the satellite communication subscriber, comprising the steps of:

sending a service select request message and checking whether a call forwarding service is selected, when the calling subscriber is a satellite communication subscriber;

sending a subscriber number input request message and checking whether the subscriber number is input, when the call forwarding service is selected;

storing the subscriber number in a subscriber number area of the call forwarding table, when the subscriber number is input;

sending a call forwarding number input request message, and checking whether the call forwarding number is input;

storing the call forwarding number in a call forwarding number area of the call forwarding table, when the call forwarding number is input; and cutting off the communication path, and monitoring a switching station; and checking whether another incoming call to the subscriber number is detected and forwarding the other incoming call to the call forwarding number corresponding to the subscriber number, when the other incoming call to the subscriber number is detected, said forwarding step being performed in a high penetration notification mode in the satellite communication system.

2. A method for forwarding a call in a high penetration notification mode in a satellite communication system having a communication terminal including a memory for storing a short message and a Liquid Crystal Display (LCD) for displaying character data, said method comprising the steps of:

(a) forming a communication path with a calling communication terminal upon detecting an incoming call, and authenticating that a calling subscriber is a satellite communication subscriber;

(b) sending a service select request message to the calling communication terminal when the calling subscriber is the satellite communication subscriber, and checking whether a short message receiving service is selected;

(c) sending a calling subscriber number input request message to the calling communication terminal when the short message receiving service is selected, and checking whether a calling subscriber number is input; and (d) reading a short message from a short message area corresponding to the calling subscriber number and sending the short message to the calling communication terminal, when the calling subscriber number is input.

3. A method for forwarding a call in a high penetration notification mode in a satellite communication system having a second communication terminal, said satellite communication system including a memory for storing a short message and a Liquid Crystal Display (LCD) for displaying character data, said method comprising:

(a) detecting the high penetration notification mode of a satellite communication terminal and setting a short message service on a service center after verifying that a subscriber authentication number matches a satellite communication subscriber number, comprising the steps of:

forming a communication path with a calling communication terminal upon detecting an incoming call, and authenticating that a calling subscriber is a satellite communication subscriber;

sending a service select request message containing a short message request service, and a short message receiving service to the calling communication terminal when the calling subscriber is the satellite communication subscriber, and checking whether a short message request service is selected;

sending a calling subscriber number input request message to the calling communication terminal when the short message request service is selected, and checking whether a subscriber number is input; and storing the subscriber number and setting a short message subscriber area in the memory when the subscriber number is input;

(b) informing the satellite communication terminal of receiving a short message through the service center, when the short message of the satellite communication terminal is received; and (c) sending the short message to the second communication terminal when the second communication terminal is adjacent to the satellite communication terminal and is connected to the service center in response to notification of receiving the short message.

* * * * *